US012537296B2

(12) United States Patent
He

(10) Patent No.: US 12,537,296 B2
(45) Date of Patent: Jan. 27, 2026

(54) PHASE SHIFTER ASSEMBLY FOR BASE STATION ANTENNA

(71) Applicant: Outdoor Wireless Networks LLC, Claremont, NC (US)

(72) Inventor: Fan He, Suzhou (CN)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 405 days.

(21) Appl. No.: 18/151,100

(22) Filed: Jan. 6, 2023

(65) Prior Publication Data

US 2023/0268646 A1 Aug. 24, 2023

Related U.S. Application Data

(60) Provisional application No. 63/311,533, filed on Feb. 18, 2022.

(51) Int. Cl.
*H01Q 1/24* (2006.01)
*H01Q 3/32* (2006.01)
*H01Q 19/10* (2006.01)
*H01Q 1/36* (2006.01)
*H01Q 23/00* (2006.01)

(52) U.S. Cl.
CPC .............. *H01Q 3/32* (2013.01); *H01Q 1/246* (2013.01); *H01Q 19/10* (2013.01)

(58) Field of Classification Search
CPC .. H01Q 3/32; H01Q 3/12; H01Q 3/36; H01Q 1/246; H01Q 1/42; H01Q 19/10; H01Q 21/26; H01Q 21/28; H01P 1/184; H01P 1/18; H02K 7/116
See application file for complete search history.

(56) References Cited

U.S. PATENT DOCUMENTS

| 7,907,096 B2 | 3/2011 | Timofeev et al. |
| 10,854,967 B2 | 12/2020 | Zimmerman |
| 2020/0006848 A1* | 1/2020 | Ding ....................... H01P 1/184 |
| 2024/0291146 A1* | 8/2024 | Liu .......................... F16H 19/04 |

FOREIGN PATENT DOCUMENTS

WO 2017165512 A1 9/2017

* cited by examiner

*Primary Examiner* — Dameon E Levi
*Assistant Examiner* — Gurbir Singh
(74) *Attorney, Agent, or Firm* — Myers Bigel, P.A.

(57) ABSTRACT

A phase shifter assembly includes a mounting substrate; a first wiper phase shifter; a second wiper phase shifter; a first wiper member pivotally mounted to the mounting substrate overlying the first wiper phase shifter, the first wiper member having a first set of teeth; a second wiper member pivotally mounted on the mounting substrate overlying the second wiper phase shifter, the second wiper member having a second set of teeth, the second set of teeth intermeshed with the first set of teeth. The first set of teeth has a first discontinuity, and the second set of teeth has a second discontinuity that is complementary to the first discontinuity, such that engagement of the first and second discontinuity enables proper alignment of the first and second wiper members relative to each other.

13 Claims, 7 Drawing Sheets

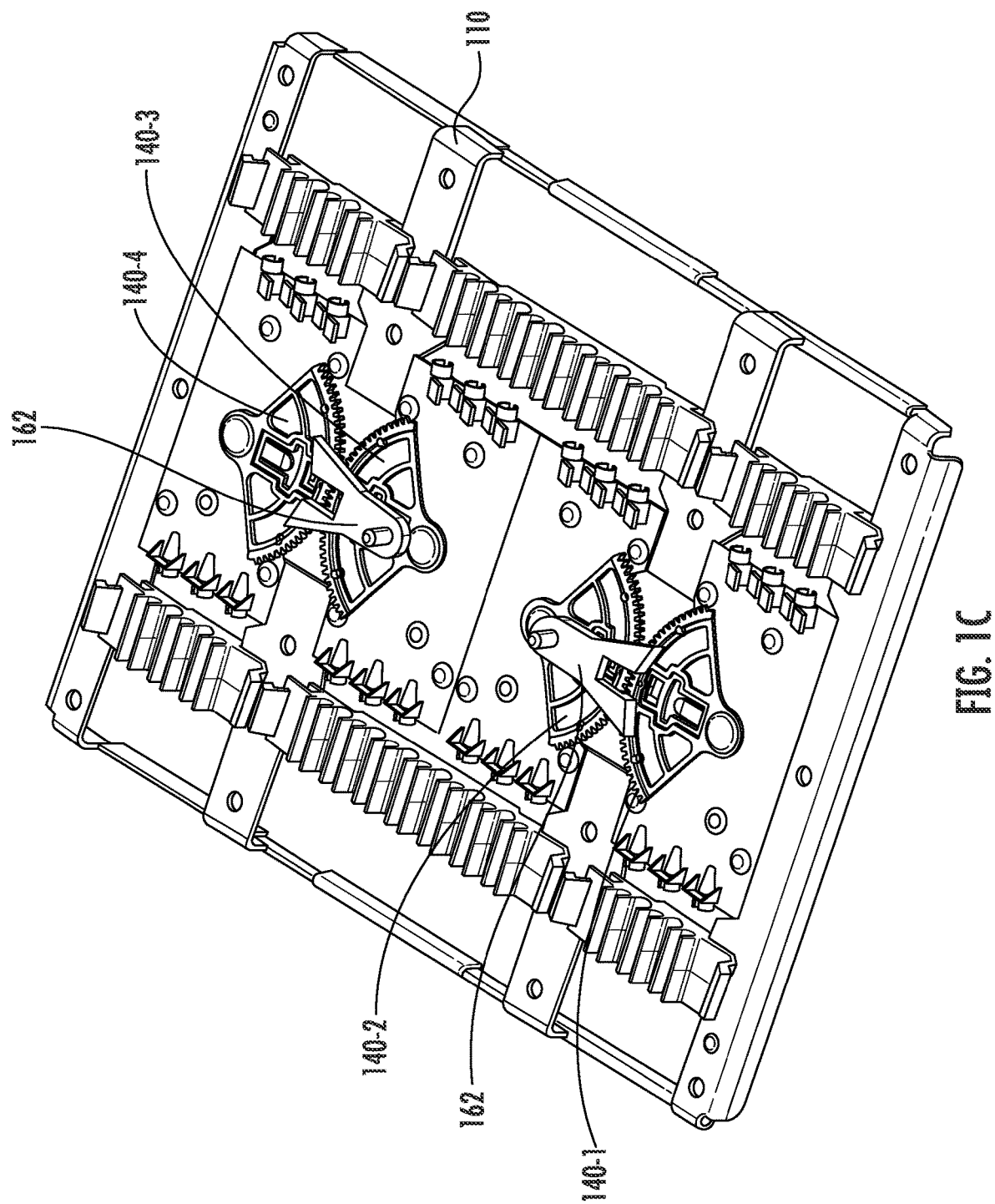

PHASE SHIFTER ASSEMBLY FOR BASE STATION ANTENNA

RELATED APPLICATION

The present application claims priority from and the benefit of U.S. Provisional Patent Application No. 63/311,533, filed Feb. 18, 2022, the disclosure of which is hereby incorporated herein by reference in full.

FIELD OF THE INVENTION

The present disclosure relates to communication systems and, in particular, to phase shifters for base station antennas.

BACKGROUND OF THE INVENTION

Base station antennas for wireless communication systems are used to transmit Radio Frequency (RF) signals to, and receive RF signals from, fixed and mobile users of a cellular communications service. Base station antennas often include a linear array or a two-dimensional array of radiating elements such as dipole, or crossed dipole, radiating elements. To change the down tilt angle of the antenna beam generated by an array of radiating elements, a phase taper may be applied across the sub-components of an RF signal that are passed to individual radiating elements or groups (sub-arrays) of radiating elements. Such a phase taper may be applied by adjusting the settings on an adjustable phase shifter that is positioned along an RF transmission path between a radio and the individual radiating elements of the base station antenna.

One known type of phase shifter is an electromechanical rotating "wiper" arc phase shifter that includes a main Printed Circuit Board (PCB) and a "wiper" PCB that may be rotated above the main PCB. Such a rotating wiper arc phase shifter typically divides an input RF signal that is received at the main PCB into a plurality of sub-components, and then capacitively couples at least some of these sub-components to the wiper PCB. These sub-components of the RF signal may be capacitively coupled from the wiper PCB back to the main PCB along a plurality of arc-shaped traces, where each arc has a different radius. Each end of each arc-shaped trace may be connected to a radiating element or to a sub-array of radiating elements. By physically rotating the wiper PCB above the main PCB, the location where the sub-components of the RF signal capacitively couple back to the main PCB may be changed, thereby changing the path lengths that the sub-components of the RF signal traverse when passing from a radio to the radiating elements. These changes in the path lengths result in changes in the phases of the respective sub-components of the RF signal, and because the arcs have different radii, the change in phase experienced along each path differs.

Typically, the phase taper is applied by applying positive phase shifts of various magnitudes (e.g., +X°, +2X° and +3X°) to some of the sub-components of the RF signal and by applying negative phase shifts of the same magnitudes (e.g., −X°, −2X° and −3X°) to additional of the sub-components of the RF signal. Thus, the above-described rotary wiper arc phase shifter may be used to apply a phase taper to the sub-components of an RF signal that are transmitted through the respective radiating elements (or sub-groups of radiating elements). Example phase shifters of this variety are discussed in U.S. Pat. No. 7,907,096 to Timofeev, the disclosure of which is hereby incorporated herein by reference in its entirety. The wiper PCB is typically moved using an actuator that includes a Direct Current (DC) motor that is connected to the wiper PCB via a mechanical linkage. These actuators are often referred to as "RET" actuators because they are used to apply the remote electronic down tilt.

SUMMARY OF THE INVENTION

As a first aspect, embodiments of the invention are directed to a phase shifter assembly for a base station. The phase shifter comprises: a mounting substrate; a first wiper phase shifter having a printed circuit board (PCB) mounted on the mounting substrate; a second wiper phase shifter having a PCB mounted on the mounting substrate; a first wiper member pivotally mounted to the mounting substrate overlying the first wiper phase shifter, the first wiper member having a third PCB and a first set of teeth; a second wiper member pivotally mounted on the mounting substrate overlying the second wiper phase shifter PCB, the second wiper member having a fourth PCB and a second set of teeth, the second set of teeth intermeshed with the first set of teeth; and a linkage coupled to the first wiper member and configured to pivot the first wiper member relative to the first wiper phase shifter PCB, wherein pivotal movement of the first wiper member pivots the second wiper member relative to the second wiper shaft shifter PCB. The first set of teeth has a first discontinuity, and the second set of teeth has a second discontinuity that is complementary to the first discontinuity, such that engagement of the first and second discontinuity enables proper alignment of the first and second wiper members relative to each other.

As a second aspect, embodiments of the invention are directed to a phase shifter assembly for a base station comprising: a mounting substrate; a first wiper phase shifter printed circuit board (PCB) mounted on the mounting substrate; a second wiper phase shifter PCB mounted on the mounting substrate; a first wiper member pivotally mounted to the mounting substrate overlying the first wiper phase shifter, the first wiper member having a third PCB and a first set of teeth; a second wiper member pivotally mounted on the mounting substrate overlying the second wiper phase shifter PCB, the second wiper member having a fourth PCB and a second set of teeth, the second set of teeth intermeshed with the first set of teeth; and a linkage coupled to the first wiper member and configured to pivot the first wiper member relative to the first wiper phase shifter PCB, wherein pivotal movement of the first wiper member pivots the second wiper member relative to the second wiper shaft shifter PCB. One of the first set of teeth and the second set of teeth has an oversized tooth, and the other of the first set of teeth and the second set of teeth has an oversized valley that is complementary to the oversized tooth, such that engagement of the oversized tooth and the oversized valley enables proper alignment of the first and second wiper members relative to each other.

BRIEF DESCRIPTION OF THE FIGURES

FIG. 1C is a perspective view of two of the phase shifters and wiper members mounted on the mounting substrate according to embodiments of the invention.

DETAILED DESCRIPTION OF THE INVENTION

Figure 1A:
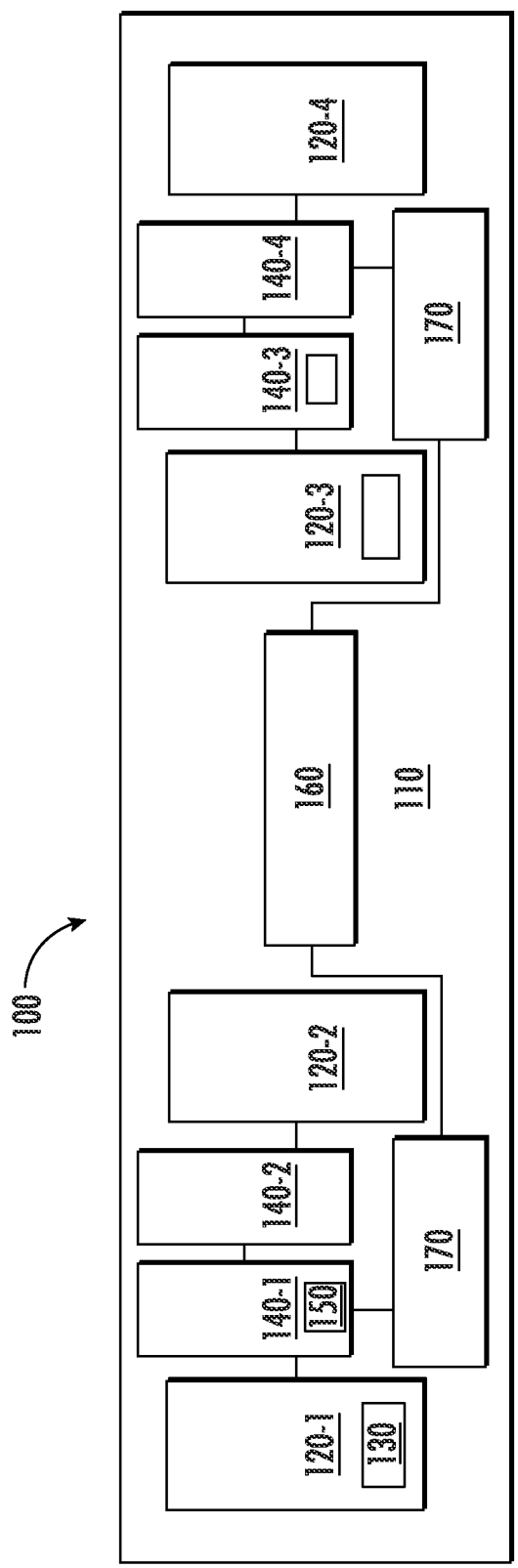
FIG. 1A is a schematic block diagram of a phase shifter assembly for a base station antenna that includes a plurality of individual phase shifters on a first level of a metal housing according to embodiments of the present inventive concepts.

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those skilled in the art. It should also be understood that the embodiments disclosed in the present disclosure may be combined in various ways so as to provide more additional embodiments.

It should be understood that in all the attached drawings, the same symbols denote the same elements. In the attached drawings, the dimensions of certain features can be changed for clarity.

It should be understood that the words in the Specification are only used to describe specific embodiments and are not intended to limit the present disclosure. Unless otherwise defined, all terms (including technical terms and scientific terms) used in the Specification have the meanings commonly understood by those of ordinary skill in the art. For brevity and/or clarity, well-known functions or structures may not be further described in detail.

The singular forms "a", "an", "the" and "this" used in the Specification all include plural forms unless clearly indicated. The words "comprise", "contain" and "have" used in the Specification indicate the presence of the claimed features, but do not exclude the presence of one or more other features. The word "and/or" used in the Specification includes any or all combinations of one or a plurality of the related listed items. The words "between X and Y" and "between approximate X and Y" used in the Specification shall be interpreted as including X and Y. The words "between approximate X and Y" and "from approximate X to Y" used in the Specification means "between approximate X and approximate Y" and "from approximate X to approximate Y", respectively.

In the Specification, when it is described that an element is "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described "directly" "on" another element, "directly attached" to another element, "directly connected" to another element, "directly coupled" to another element or "directly contacting" another element, there will be no intermediate elements. In the Specification, a feature that is arranged "adjacent" to another feature, may denote that a feature has a part that overlaps an adjacent feature or a part located above or below the adjacent feature.

In the specification, words expressing spatial relations such as "upper", "lower", "left", "right", "front", "rear", "top", and "bottom" may describe the relation between one feature and another feature in the attached drawings. It should be understood that, in addition to the locations shown in the attached drawings, the words expressing spatial relations further include different locations of a device in use or operation. For example, when a device in the attached drawings rotates reversely, the features originally described as being "below" other features now can be described as being "above" the other features. The device may also be oriented by other means (rotated by 90 degrees or at other locations), and at this time, a relative spatial relation will be explained accordingly.

FIG. 1A is a schematic block diagram of an exemplary phase shifter assembly 100 for a base station antenna that includes a plurality of individual phase shifters 120 on a mounting substrate 110 (e.g., a metal housing/structure, such as a reflector of an antenna) according to embodiments of the present inventive concepts. The individual phase shifters 120 may be collinear on the mounting substrate 110, and thus may be referred to herein as a "linear array." Each individual phase shifter 120 may be a rotary wiper phase shifter that includes a stationary main PCB and a movable/rotatable wiper PCB (one main PCB and one movable PCB are shown schematically at 130 and 150 in FIG. 1A as being associated with phase shifter 120-1 and wiper members 140-1.) Each moveable PCB 150 may be mounted on a separate respective wiper member 140. In some embodiments, each moveable PCB 150 may be formed integrally with the wiper member 140 as a monolithic structure. Although FIG. 1A provides an example in which four individual phase shifters 120 (120-1, 120-2, 120-3, and 120-4) are mounted on the mounting substrate 110, the mounting substrate 110 may include more or fewer phase shifters 120. For example, the mounting substrate 110 may include two, three, five, six, seven, or more individual phase shifters 120.

The individual phase shifters 120 on the mounting substrate 110 may be arranged in pairs, where each individual phase shifter 120 of a pair is coupled to the other individual phase shifter 120 in the pair via wiper members 140. For example, the phase shifters 120-1 and 120-2 may be a pair and may be coupled to each other via wiper members 140-1 and 140-2. As another example, the phase shifters 120-3 and 120-4 may be a pair and may be coupled to each other via wiper members 140-3 and 140-4. In particular, the wiper members 140-1, 140-2, 140-3, and 140-4 may be associated with the phase shifters 120-1, 120-2, 120-3, and 120-4, respectively, where the wiper members 140-1 and 140-2 are coupled to each other and the wiper members 140-3 and 140-4 are coupled to each other. Coupling of the pairs of wiper members 140 may be achieved via intermeshing gear teeth 135, 155 (see FIGS. 1B and 1C). Each of the wiper members 140 is pivotally mounted to the housing 110; the intermeshing of the teeth 135, 155 causes the paired wiper members 140 to rotate together relative to the mounting substrate 110.

Figure 1B:
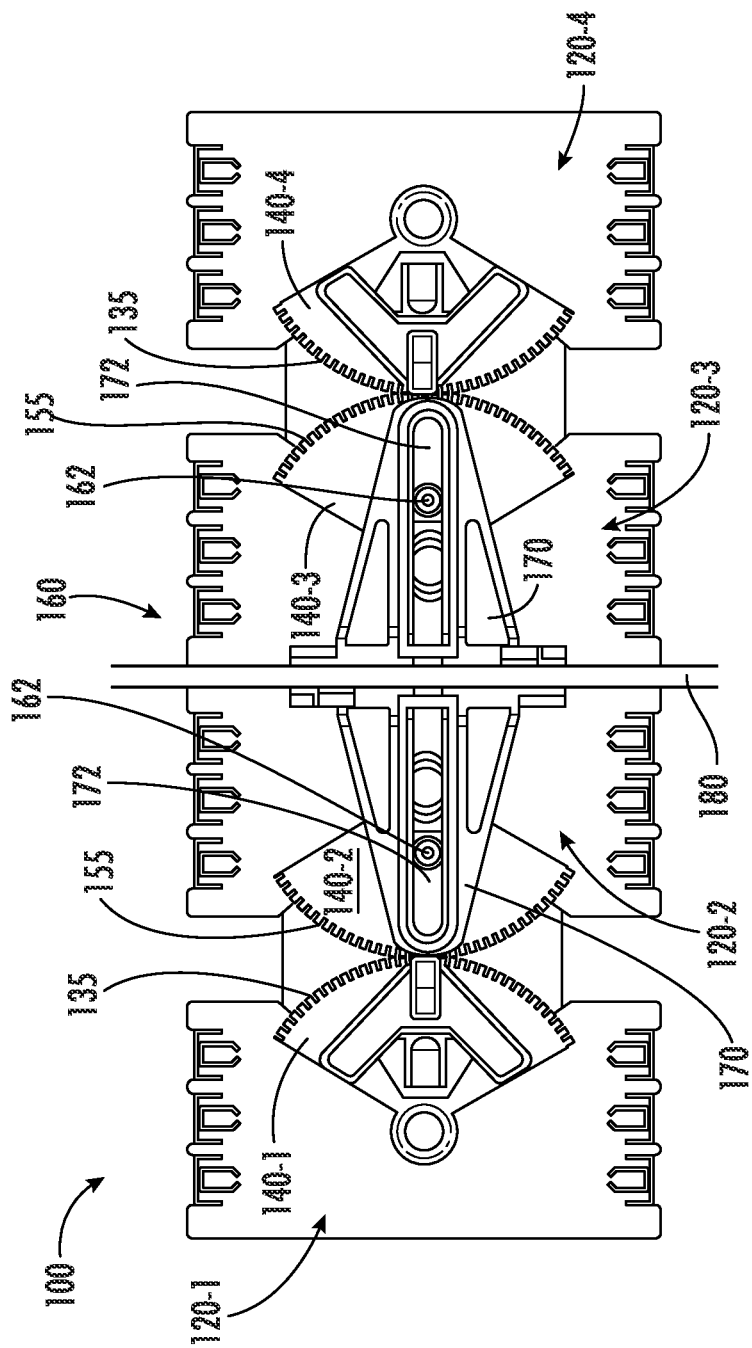
FIG. 1B is a schematic plan view of a phase shifter assembly for a base station antenna according to embodiments of the present inventive concepts.

FIGS. 1A-1C also illustrate that the phase shifter assembly 100 includes a linkage 160 that includes a drive link 180, two carrier links 170 with slots 172, and two extension posts 162 that are fixed to the supports 140-1, 140-4 and received in the slots 172. The linkage 160 is configured to control movement of (i.e., to drive) the wiper members 140. Specifically, movement of the drive link 180 draws the carrier links 170 in a direction parallel to the axis of the drive link 180. This movement draws the posts 162 along, which in turn causes the wiper members 140-1, 140-4 to pivot. Pivoting of the wiper members 140-1, 140-4 causes wiper members 140-2, 140-3 coupled thereto to pivot also due to the intermeshed gear teeth 135, 155. The pivotal movements of the wiper members 140 relative to their corresponding phase shifters 120 causes the desired phase shift to the antenna beams generated by the arrays of radiating elements associated with the phase shifters 120.

As one example, the drive link 180 may be a rod that moves along its longitudinal axis in response to movement of a motor (not shown). As another example, the drive link may be a worm gear that rotates about its longitudinal axis, and the carrier links 170 may have threads that intermesh with the threads of the drive link 180 such that rotation of the drive link 180 moves the carrier links 170 parallel to the axis of the drive link 180. Those of skill in this art will appreciate that other mechanisms may be employed to move the carrier links 170 in a desired direction.

As would be understood by a person skilled in the art, the phase shifter assembly 100 may be used in a base station antenna that includes radiating elements that are coupled to the phase shifter assembly 100. In particular, the base station antenna may include a multi-column array of radiating elements. Each column of the multi-column array may be coupled to one of the phase shifters (or to two of the phase shifters, if dual-polarized radiating elements are used to form the array). The radiating elements in each column receive the phase-shifted sub-components of an RF signal that are output by respective one of the individual phase shifters 120. In some embodiments, the plurality of individual phase shifters 120 may be configured to provide a plurality of different phase-shifted RF output values to the respective radiating elements or to respective sub-arrays of radiating elements.

The base station antenna may be a single-band antenna that includes one or more arrays of radiating elements that operate in a single frequency band or may be a multi-band antenna that includes arrays of radiating elements that operate in multiple frequency bands. As an example, the radiating elements in the multi-column array may be configured to transmit and receive RF signals having using frequencies within a portion of the 2.0 gigahertz (GHz) to 4.2 GHz frequency range. Accordingly, embodiments of the present inventive concepts may operate using frequencies such as 2.5 GHz, 3.0 GHz, 3.4 GHz, 3.5 GHz, and/or 3.75 GHz. Additionally, or alternatively, the base station antenna may operate using other frequencies between 2.0 GHz and 4.2 GHz or frequencies above or below this range.

Examples of a base station antenna with a rotary wiper phase shifter coupled to an array of radiating elements are discussed in U.S. Pat. No. 10,854,967 to Zimmerman and PCT Publication No. WO2017/165512 to Bisiules, the disclosures of each of which are hereby incorporated herein by reference in their entireties. Moreover, the plurality of individual phase shifters 120 according to some embodiments herein may be a part of a feed network of the base station antenna. Each phase shifter may be coupled to a respective port of a radio such as a beamforming radio.

Figure 2:
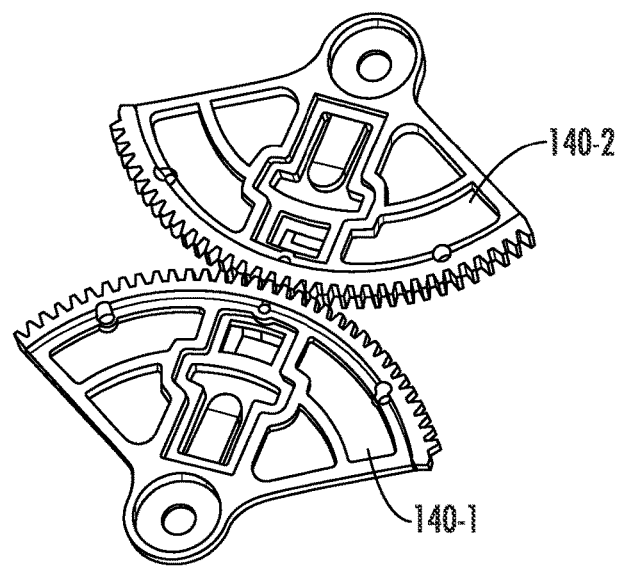
FIG. 2 is a perspective view of a coupled pair of wiper members of FIG. 1C.
Figure 3A:
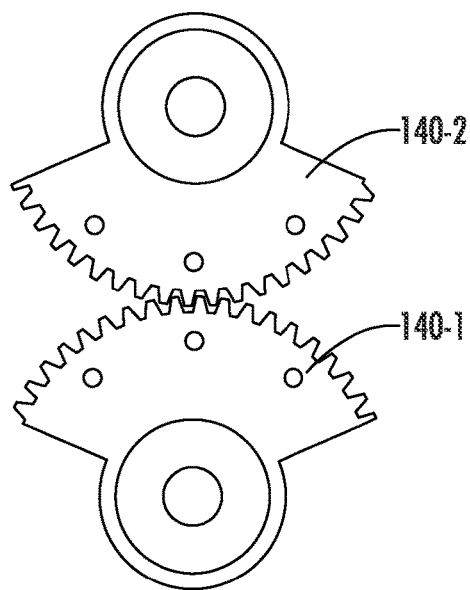
FIG. 3A is a schematic top view of the pair of wiper members of FIG. 2 assembled in correct alignment.
Figure 3B:
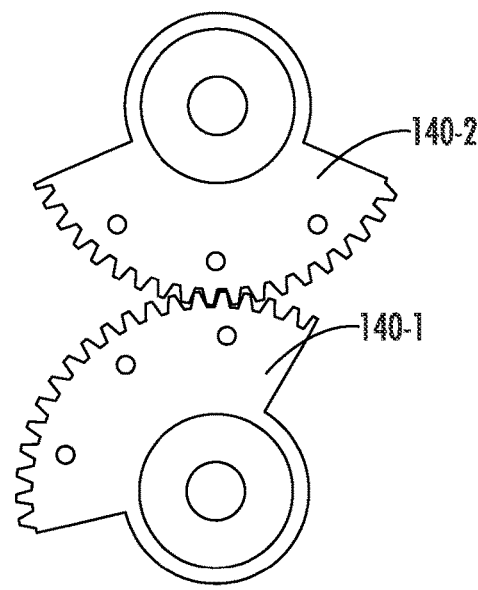
FIG. 3B is a schematic top view of the wiper members of FIG. 3A assembled in incorrect alignment.

Referring now to FIG. 2, two wiper support members 140-1, 140-2 are shown therein. Based on the foregoing discussion, it can be understood that, because the wiper members 140-1, 140-2 are coupled via their intermeshed teeth 135, 155, it is critical that the wiper members 140-, 140-2 be correctly aligned with each other in order to be properly positioned for phase shifting. For example, as demonstrated by a comparison of FIGS. 3A and 3B, the wiper members 140-1, 140-2 can be misaligned relatively easily during intermeshing (see FIG. 3B), which misalignment would hamper, if not completely undermine, the performance of the phase shifters 120 to which they correspond. Thus, currently great care is taken to ensure that coupled pairs of wiper members, such as the wiper members 140-1, 140-2, are properly aligned, which requires time, tedious effort, and in some instances special tools.

Figure 4A:
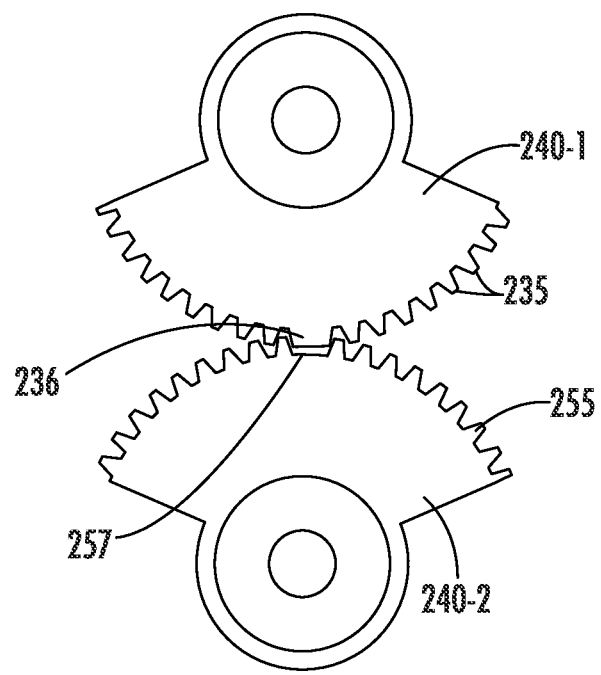
FIG. 4A is s schematic top view of a coupled pair of wiper members with an oversized tooth and valley according to embodiments of the invention.
Figure 4B:
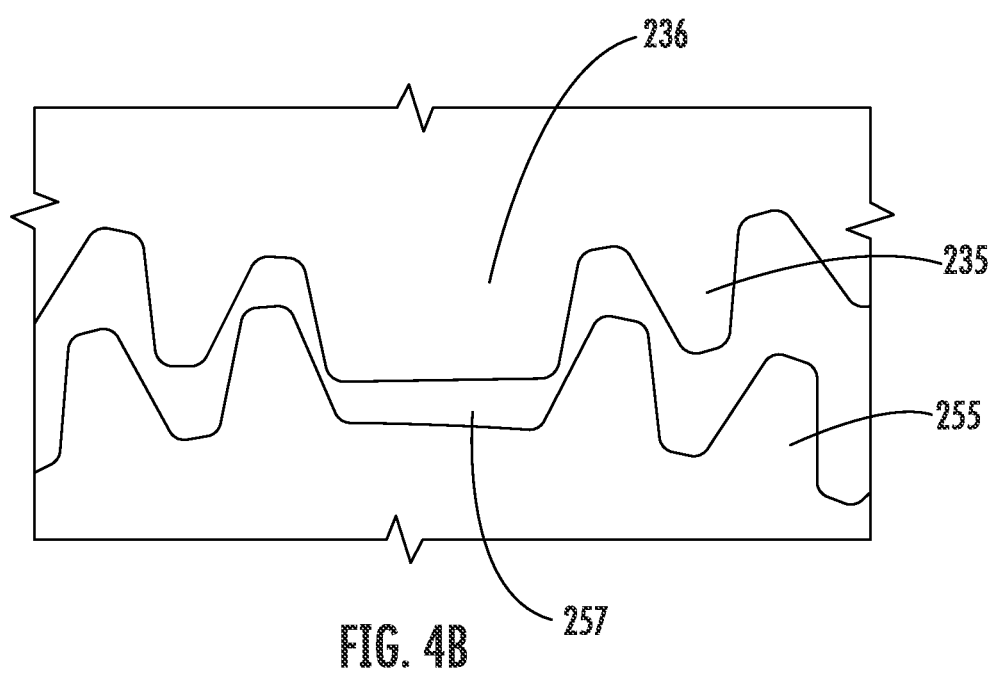
FIG. 4B is a greatly enlarged partial view of the oversized tooth and valley of FIG. 4A.

Referring now to FIGS. 4A and 4B, a pair of wiper members, designated broadly at 240-1, 240-2, are shown therein. The wiper members 240-1, 240-2 are similar to the wiper members 140-1, 140-2 discussed above, but are configured so that the wiper member 240-1 includes an oversized tooth 236 within the teeth 235, and the wiper member 240-2 includes an oversized "valley" 257 between two of its teeth 255. The oversized tooth 236 and oversized valley 257 are configured to mesh with each other as shown in FIG. 4B, but the oversized tooth 236 is sufficiently large that it cannot fit within any other valley present between the teeth 255. Consequently, the teeth 235 of the wiper member 240-1 and the teeth 255 of the wiper member 240-2 can only mesh when the oversized tooth 236 is aligned with the oversized valley 257. As a result, the wiper members 240-1 and 240-2 are ensured of being correctly aligned with each other during installation. Moreover, because the oversized tooth 236 and oversized valley 257 are quickly and easily identified visually, installation can proceed quickly and with little confusion or wasted motion.

Figure 6:
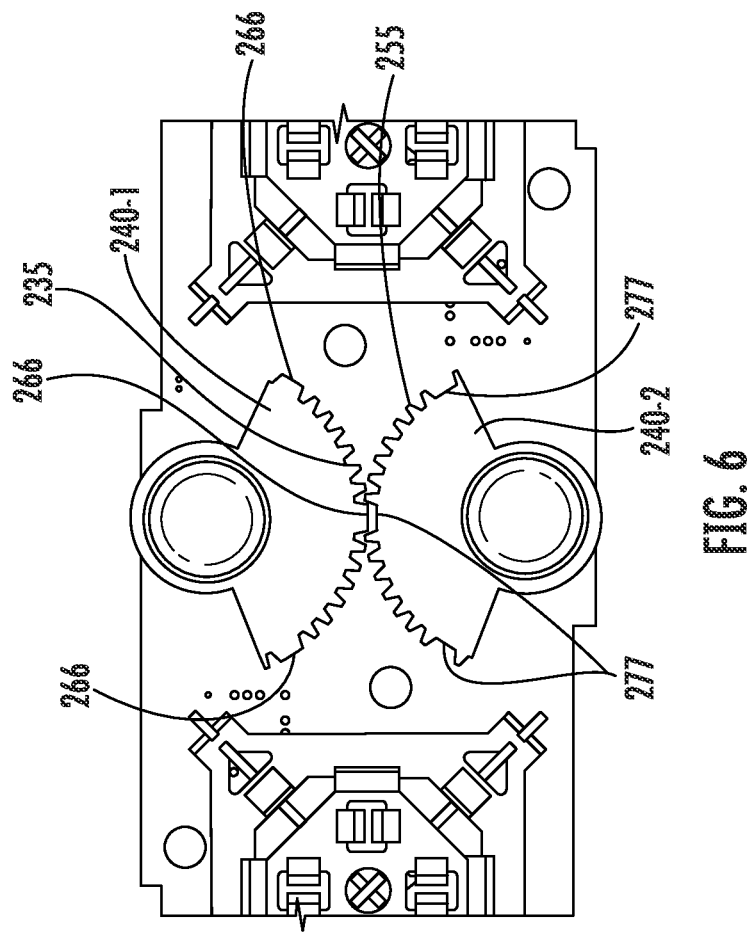
FIG. 6 is a top view of a coupled pair of wiper members according to another embodiment of the invention.
Figure 5:
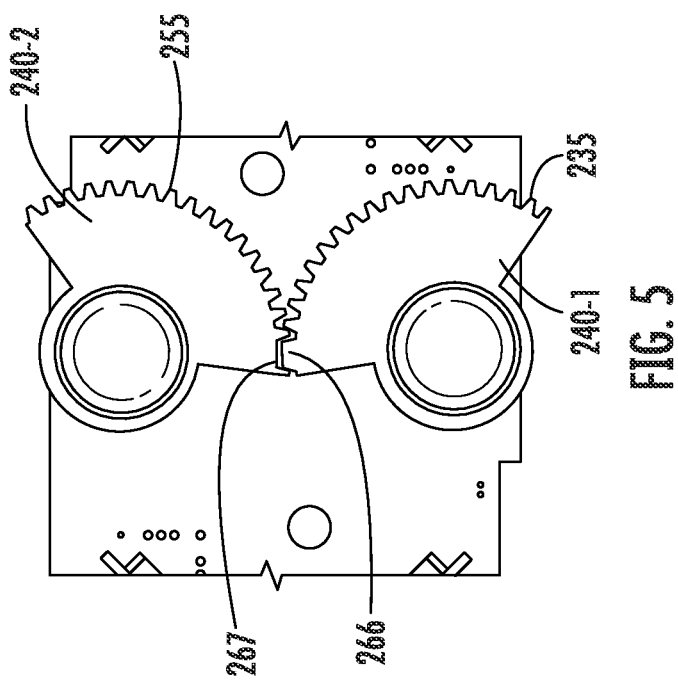
FIG. 5 is a schematic top view of a coupled pair of wiper members according to an alternative embodiment of the invention.

The teeth of the wiper members 240-1, 240-2 may take other forms that ensure correction alignment. For example, FIG. 5 shows that an oversized tooth 266 may be positioned at one end of the teeth 235 rather than in the center, and an oversized valley 267 may be positioned in a corresponding position at one end of the teeth 255. This configuration can also ensure proper intermeshing of the teeth 235, 255. FIG. 6 shows another example, in which three oversized teeth 276 are present in the teeth 235, and three oversized valleys 277 are present in corresponding locations of the teeth 255. This embodiment may provide the technician with more flexibility during installation while still ensuring proper alignment of the wiper members 240-1 240-2.

Figure 7:
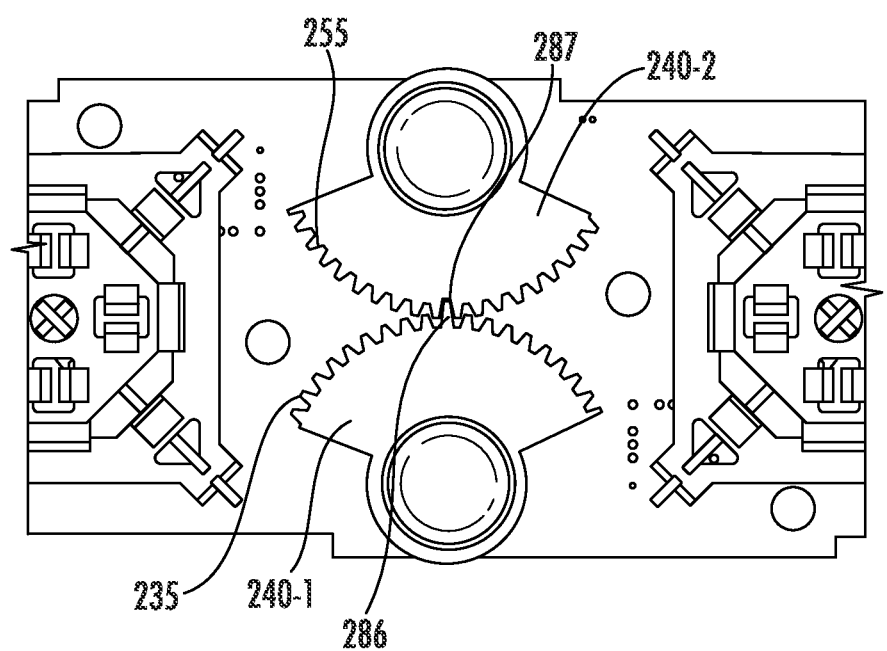
FIG. 7 is a top view of a coupled pair of wiper members according to a further alternative embodiment of the invention.

Still another alternative configuration is shown in FIG. 7, wherein a tooth 286 within the teeth 235 is oversized by virtue of being longer/taller than the other teeth 235, and the corresponding valley 287 within the teeth 255 is oversized by virtue of being deeper than the remaining valleys. In this embodiment, it may be desirable to modify the shape of the longer tooth 286 (e.g., it may have sides that are less sharply angled than the other teeth 255) in order to ensure that the wiper members 240-1, 240-2 can still rotate smoothly even with the longer tooth 286 present.

Those skilled in this art will appreciate that the phase shifter assemblies shown herein may take even more different forms. For example, although the oversized teeth are shown herein on the wiper member 240-1, and the oversized valleys are shown on the wiper member 240-2, this arrangement may be reversed in any of the embodiments shown. Also, other types of complementary discontinuities (e.g., teeth and/or valleys of different shapes, textured areas, sinuous surfaces, etc.) that still enable the wiper members 240-1, 240-2 to engage and rotate in concert while ensuring proper alignment may be employed.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A phase shifter assembly for a base station, comprising:
   a mounting substrate;
   a first wiper phase shifter having a first printed circuit board (PCB) mounted on the mounting substrate;
   a second wiper phase shifter having a second PCB mounted on the mounting substrate;
   a first wiper member pivotally mounted to the mounting substrate overlying the first wiper phase shifter, the first wiper member having a third PCB and a first set of teeth;
   a second wiper member pivotally mounted on the mounting substrate overlying the second wiper phase shifter, the second wiper member having a fourth PCB and a second set of teeth, the second set of teeth intermeshed with the first set of teeth; and
   a linkage coupled to the first wiper member and configured to pivot the first wiper member relative to the first wiper phase shifter PCB, wherein pivotal movement of the first wiper member pivots the second wiper member relative to the second wiper shifter PCB;
   wherein the first set of teeth has a first discontinuity, and the second set of teeth has a second discontinuity that is complementary to the first discontinuity, such that engagement of the first and second discontinuity enables proper alignment of the first and second wiper members relative to each other,
   wherein the first discontinuity is an oversized tooth, and the second discontinuity is an oversized valley.

2. The phase shifter assembly defined in claim 1, wherein the oversized tooth has a first width than is greater than a second width of a tooth of the first set of teeth.

3. The phase shifter assembly defined in claim 1, wherein the first discontinuity is a tooth having a different shape than the remaining teeth of the first set of teeth, and the second discontinuity is a valley having a different shape than the remaining valleys of the second set of teeth.

4. The phase shifter assembly defined in claim 1, wherein the first wiper member includes an extension post that engages the linkage.

5. The phase shifter assembly defined in claim 4, wherein the linkage includes a carrier member with a slot, and wherein the slot receives the extension post.

6. The phase shifter assembly defined in claim 5, wherein the linkage includes a drive link having a longitudinal axis, and wherein movement of the drive link causes the carrier link to move in a direction parallel with the longitudinal axis.

7. The phase shifter assembly defined in claim 1, wherein the mounting substrate is a reflector panel of a base station antenna.

8. A phase shifter assembly for a base station, comprising:
   a mounting substrate;
   a first wiper phase shifter having a first printed circuit board (PCB) mounted on the mounting substrate;
   a second wiper phase shifter having a second PCB mounted on the mounting substrate;
   a first wiper member pivotally mounted to the mounting substrate overlying the first wiper phase shifter, the first wiper member having a third PCB and a first set of teeth;
   a second wiper member pivotally mounted on the mounting substrate overlying the second wiper phase shifter, the second wiper member having a fourth PCB and a second set of teeth, the second set of teeth intermeshed with the first set of teeth; and
   a linkage coupled to the first wiper member and configured to pivot the first wiper member relative to the first wiper phase shifter PCB, wherein pivotal movement of the first wiper member pivots the second wiper member relative to the second wiper shifter PCB;
   wherein one of the first set of teeth and the second set of teeth has an oversized tooth, and the other of the first set of teeth and the second set of teeth has an oversized valley that is complementary to the oversized tooth, such that engagement of the oversized tooth and the oversized valley enables proper alignment of the first and second wiper members relative to each other.

9. The phase shifter assembly defined in claim 8, wherein the oversized tooth has a first width than is greater than a second width of a tooth of the first set of teeth.

10. The phase shifter assembly defined in claim 8, wherein the first wiper member includes an extension post that engages the linkage.

11. The phase shifter assembly defined in claim 10, wherein the linkage includes a carrier member with a slot, and wherein the slot receives the extension post.

12. The phase shifter assembly defined in claim 11, wherein the linkage includes a drive link having a longitudinal axis, and wherein movement of the drive link causes the carrier link to move in a direction parallel with the longitudinal axis.

13. The phase shifter assembly defined in claim 8, wherein the mounting substrate is a reflector panel of a base station antenna.

* * * * *